United States Patent Office 2,928,780
Patented Mar. 15, 1960

2,928,780

SOURCE OF PRODUCTS OF NUCLEAR FISSION

Paul Harteck and Seymour Dondes, Troy, N.Y., assignors, by mesne assignments, to the United States of America as represented by the United States Atomic Energy Commission No Drawing. Application October 26, 1956
Serial No. 618,662

3 Claims. (Cl. 204—154.2)

This invention relates to a source of the products of nuclear fission and particularly the invention relates to a fibrous or wooly material containing an isotope fissionable by thermal neutrons or other isotope that can be converted to a fissionable isotope.

The term "fission products" is generally used to refer to those isotopes of intermediate atomic number that are produced as fragments in the fission of one of the fissionable isotopes, uranium-233, uranium-235 and plutonium-239. The fission process, however, also has other results: Energy in the form of heat and of other forms of radiation is produced, and certain heavy isotopes, uranium-238 and thorium-232 are converted by fission-liberated neutrons to the fissionable isotopes plutonium-239 and uranium-233, respectively. The energy and the fissionable isotopes are also products of nuclear fission and we so refer to them.

A principal object of this invention is to provide a new material which is a source of the products of fission. Another object of the invention is to provide a material which makes possible the efficient utilization of fission-fragment recoil energy in radiation chemistry. A further object of the invention is to provide a material that can be converted to a fission fuel without extensive chemical processing to remove fission fragments. A particular object of the invention is to provide a new fuel for a nuclear reactor. Still another object of the invention is to provide a method for producing pure fission-fragment isotopes. The many other objects and the many advantages of this invention will appear in the following description.

Broadly speaking, the objects of our invention are attained through a mineral fiber containing, as its essential ingredient, one or more of the isotopes thorium-232, uranium-233, uranium-235, uranium-238 and plutonium-239 which, upon bombardment by neutrons, yield the products of fission. These products are, as stated before, fission fragments, energy and fissionable isotopes.

In our co-pending application S.N. 570,651, filed March 6, 1956, now Patent No. 2,898,277, dated August 4, 1959, there was disclosed a method of fixing nitrogen. This method comprises the step of bringing air, generally under pressure, into contact with a fine dispersion of fissionable material in a neutron flux in order to utilize the recoil energy of the fission fragments. The reason for using this form of ionizing radiation is the tremendous amount of energy contained in the recoil fission fragments. However, when the fissionable material is used in the form of fine particles, the efficiency of utilization of the fission-fragment recoil energy is relatively low. A considerable amount of the energy is lost by self-absorption before the recoiling fragments leave the solid. For example, when exposing finely divided uranium oxide powder highly enriched in uranium-235 to neutrons, about 90% of the fission fragments are absorbed in the powder. Only the remaining 10% escape from the surface of the powder particles to transfer their energy to the chemical reactants. In terms of the kinetic energy of the fission fragments, such a process is only about 10% efficient.

We have now found that the efficiency of the utilization of the recoil energy of the fission fragments may be increased to greater than 60% by incorporating the fissionable material in a mineral fiber. We use the terms "mineral fiber" and "fibrous mineral" to designate primarily fibrous glass in the wool form or in the filamentary form although we conceive that other mineral fibers as well may be used; for example, those fibers generally referred to as mineral wool or rock wool that are spun from slag or other materials. Accordingly, while our description is directed particularly to fibrous glass, it should be kept in mind that our invention also comprehends other forms of mineral fibers.

The range of the fission fragments of uranium-235 and of plutonium-239 is around 10 microns in glass on an average. Accordingly, whenever it is desired to remove the fission-fragment products from the glass wool in accordance with our invention, the diameter of the fibers should be less than about 10 microns. For greatest efficiency, we prefer to use glass fibers having a diameter in the range of 1–5 microns. When uranium is employed in the fibrous glass, it should be in the form of $U_3O_8$ as there is greater difficulty in making the wool when using $UO_2$. Uranium-containing glass wool resembles ordinary glass wool in fibers of small diameter, but has a pale yellow color in fibers of relatively larger diameter, for example, of the order of 25 microns. In other respects the mechanical properties of the uranium-containing fibrous glass are similar to the ordinary commercial product.

The fibrous glass of our invention may be prepared by any of the conventional methods. For example, the continuous filament process of Patent Number 2,234,986 may be used, particularly for the coarser fibers. Either of the processes employing jets of hot gas (or steam) may also be used, and the process using the combustion products of a hydrocarbon has been employed for the finer wool we used. The latter process, disclosed in Patent Number 2,489,242, can be used, it is understood, to produce fibers as fine as 0.25 micron in diameter.

The following examples are presented to illustrate our invention with the understanding that the invention is not limited to the details described. In these examples, the fibrous glass had the following typical composition: $SiO_2$ 44.98%; $Al_2O_3$ 3.48%; $TiO_2$ 13.46%; $ZrO_2$ 4.49%; $Na_2O$ 17.96%; $U_3O_8$ 9.87% (or equivalent $UO_2$) and $Fe_2O_3$ 0.26%. This is the composition referred to as 10% uranium oxide glass.

Example 1

To demonstrate the stability of the glass wool under neutron irradiation, fiber samples containing normal uranium and of 1 micron diameter were irradiated with neutrons in the Brookhaven National Laboratory reactor for 24 hours at room temperature. The wool was sealed in a quartz container having an atmosphere of nitrous oxide and the neutron flux at the position of the container was $3 \times 10^{12}$ neutrons/cm.$^2$/sec. There was no evidence of radiation damage.

Example 2

To demonstrate further the properties of uranium-containing glass wool under neutron irradiation, another sample containing 10% natural uranium oxide was irradiated in a vacuum at 175° C. for 10 days. The neutron flux was $3.8 \times 10^{12}$ neutrons/cm.$^2$/sec. Again there was no evidence of radiation damage.

Example 3

In order to determine the radiation stability of glass wool containing uranium enriched in the 235–isotope, a series of samples of substantially the same composition were irradiated under the same conditions as in Example 2. This time, however, the glass wool contained 10% uranium oxide enriched to at least 90% in uranium-235. This time, it was noted that, under the vacuum conditions prevailing, the glass wool tended to sinter together. The reason for this is that the energy liberated in the fibers of one micron diameter could not be removed fast enough by radiation alone, and the fibers overheated and as a result tended to sinter. When the same experiment was conducted in a helium atmosphere, even at a relatively low pressure, the sintering effect was reduced. At a still higher pressure of air, about 10 atmospheres, there was practically no sintering.

Example 4

To determine the effect of fiber diameter on the stability of glass fibers, 25-micron fibers containing 10% oxide of uranium enriched to more than 90% in uranium-235 were exposed to a neutron flux of $3.8 \times 10^{12}$ neutrons/cm.$^2$/sec. in a vacuum for 30 days at 175° C. Another sample was exposed to a flux of $3.0 \times 10^{12}$ neutrons/cm.$^2$/sec. in a vacuum for 10 days at 400° C. In neither case was any sintering or destruction observed.

Example 5

To determine irradiation effects on the tensile strength of glass fibers, 25 micron fibers of substantially the composition indicated above, but containing 10% oxide of uranium enriched to more than 90% in uranium-235, were exposed to a neutron flux of $2.5 \times 10^{12}$ neutrons/cm.$^2$/sec., at about 45° C. in the reactor at Brookhaven National Laboratories. In this case, aluminum containers were used, each filled with air at one atmosphere and each having two aluminum rods upon which the fibers were wound. After 681 hours irradiation time, the aluminum rods were bent out of shape, but no visual effect on the fibers was noted. The following measurements were made on the tensile strength of the fibers after irradiation:

| Irradiation time (hours): | Tensile strength (lbs./sq. in.) |
|---|---|
| 0 (blank) | 243,000 |
| 76 | 72,000 |
| 226 | 65,000 |
| 681 | 61,000 |

Example 6

This experiment demonstrated the efficiency of utilization of the fission fragments recoiling out of the uranium-containing glass wool. A number of samples were prepared, each weighing 10 milligrams and containing 10% uranium oxide, the uranium being enriched to greater than 90% in uranium-235. The samples were sealed in individual quartz vessels, each having an atmosphere consisting essentially either of ammonia or of methane at a pressure of about 10 atmospheres. The glass fiber diameter was approximately one micron and the samples were exposed to a neutron flux of $2.5 \times 10^{12}$ neutrons/cm.$^2$/sec. at 10° C. After irradiation the samples were analyzed first by low temperature-vapor pressure methods. For the ammonia samples, nitrogen and hydrogen were determined. A sample vessel was opened at liquid nitrogen temperature and the nitrogen and hydrogen were determined. A portion of the nitrogen-hydrogen mixture was removed into a separate system and a measured volume of oxygen was added. The mixture was burned to convert the hydrogen to water which was condensed. The volume of condensate served as a check on the oxygen consumption in the hydrogen determination. The nitrogen was determined by difference. The temperature of the liquid ammonia was raised to that of Dry Ice and the ammonia was removed by pumping. Hydrazine was desorbed from the glass wool by heating with boiling water. The amount of hydrazine was determined also.

For methane, the sample vessels were also opened at the temperature of liquid nitrogen and the total of methane and hydrogen determined. A portion of the methane-hydrogen mixture was removed and burned with a measured volume of oxygen. The products were condensed in liquid nitrogen. The volume of hydrogen produced was determined from the oxygen consumption. The analytical procedure used thereafter was similar to the ammonia-product analysis above.

Based on this analysis of the products formed by ionizing particles, it was determined that approximately 60–75% of the kinetic energy of the fission fragments had been absorbed by the gas. The irradiation of ammonia produced nitrogen and hydrogen together with a small amount of hydrazine (at a dose of about $10^8$R). The irradiation of methane produced ethane and hydrogen, up to a dosage of $10^8$R, together with some propane and butane. At $10^{10}$R, most of the methane is decomposed into hydrogen, carbon and non-volatile tars.

A convenient method of indicating the reaction efficiency is in terms of the number of molecules formed or decomposed per 100 electron volts. For ammonia, this value was about 5, depending on temperature and pressure while for the methane reaction the value was about 10.

Example 7

A number of samples were prepared similar to those of Example 6, except that the glass wool was immersed in liquid ammonia. Samples were exposed to the neutron flux in the same way and analyzed in the same way. In this case the products formed in the liquid ammonia indicated that 80–90% of the kinetic energy of the fission fragments had been transferred to the liquid phase. The difference between this experiment and that of Example 6 may be ascribed to the relative stopping powers of the gas and the liquid for ionizing radiation. In a gas the range of the fission fragments is greater, and therefore relatively larger proportions of the fragments pass through the gas and impinge on and are absorbed by adjacent glass fibers before completing their normal path in the gas. Because the liquid is denser, the range of the fission fragments is lower and accordingly a greater proportion of the energy is transferred to the liquid and fewer fragments are absorbed by adjacent fibers.

It is evident from the foregoing examples that pure fission fragments can be produced easily and cheaply from a fissionable material and the source material may easily be regenerated. The irradiated glass wool containing uranium-235 or other fissionable material is immersed in a solution of nitric acid. By maintaining the temperature below about 50° C. dissolution of the glass is substantially prevented. The nitric acid solution may be concentrated by evaporation to produce a product containing the fission fragments (mainly as nitrates) in pure form. Should there be any silica or uranium in this solution, these may be removed after removal of the water, by a simple treatment with fluorine and hydrofluoric acid using well known techniques. The fission products are then available in concentrated form for use in radiation processes employing beta and gamma radiation.

While the foregoing description has emphasized the use of uranium-235 as a source of the products of fission, similar results may be obtained using uranium-233 or plutonium-239. The range of the fission fragments of these fissionable isotopes is approximately the same as that of the fission fragments of uranium-235.

The article of this invention is also useful in preparing fissionable material. Instead of using uranium-235 in glass wool, uranium-238 may be used, or natural uranium. When this is exposed to neutrons, say in a reactor, plutonium-239 is formed in situ. Fission fragments that may result from the process recoil from the surface of the fibers leaving the fissionable plutonium-239 virtually free of the fission fragments formed in the process; thereby, the expensive separation processes may be simplified and the cost reduced. Similar results may be obtained using thorium-232 to produce a fiber containing uranium-233. In each case, without extensive purification, the glass wool fibers may be used directly as a source of fission fragment products or of energy as a nuclear fuel. Alternatively, the fissionable isotope may be recovered by treating the glass with at least one of the gases selected from the group of fluorine and hydrogen fluoride. In the case of uranium-238 this treatment serves to separate excess uranium as the gaseous $UF_6$. In the case of the thorium-232, such treatment serves to separate the uranium-233 as the hexafluoride. The gaseous uranium hexafluoride is readily separated by fractional condensation from other volatile fluorides that may form, such as silicon tetrafluoride.

Glass compositions suitable for our invention are included in the following ranges of concentrations by weight: $SiO_2$ 40–50%; $Al_2O_3$ 5–12%; $TiO_2$ 10–20%; $ZrO_2$ 2–7%; $Na_2O$ 15–25%; $U_3O_8$ (or equivalent $UO_2$) 0–15%.

Of course the mineral wool of our invention should be free of elements having high neutron capture cross sections, such as boron oxide, and in some instances titanium should be substituted also.

To produce materials free of fission products, it is desirable to use glass fibers of 1–5 microns in diameter. However, for some purposes greater fiber strength may be required, as for special geometric configurations, and in these cases a thicker fiber is useful. For example, fibers of 25-microns thickness may be used for the recovery of the energy liberated by the fission process in the form of heat. The heat exchange capacity of glass fibers to a fluid is extremely large because of the extremely large surface area, and a packed bed of the glass wool containing the fissionable material may be used in the core of a nuclear reactor. Further, the pressure drop through the glass wool may be made relatively small and the fibers are extremely low in cost compared with other forms of solid fuel elements. For this purpose, helium or carbon dioxide may be used as the heat exchange medium in a closed cycle and the glass should be compounded with a relatively high softening point, for example, about 1000° C. The heat content of the gas may be used in a gas turbine or it may be transferred to water to produce steam for driving a steam turbine. Since a large proportion of the fission fragments are transferred to the coolant stream, they are readily separated as by filtration, adsorption or electrostatic precipitation. The fibrous glass may also be used to produce heat or fission fragment products in conjunction with any of the more usual reactors using the latter as a source of neutrons.

Similarly the glass wool incorporating a fissionable material may be used in a low-temperature reactor to be used itself as a source of neutrons, for example, in the manufacture of isotopes or for other purposes. With about 450 liters of heavy water as the moderator and coolant and with a temperature rise of about 30° C. in the coolant flowing at the rate of about 450 liters per second, a neutron flux of about $5 \times 10^{14}$ neutrons/cm.$^2$/sec. is obtained, taking into account the losses of neutrons from such a reactor, e.g., to the control rods, etc. The power produced by this reactor is about 58 megawatts.

In experimental reactors of low neutron flux, of the order of $10^{12}$ neutrons/cm.$^2$/sec., for use in a manner similar to the so-called swimming-pool type, discrete fuel elements may be used consisting of glass fibers or wool encased in a glass jacket or in the annulus between two glass tubes. This will prevent the escape of fission products into the coolant flowing, for example, through the inner glass tube. Similarly the glass fibers may be sheathed with glass by casting the glass around them.

The article of our invention is also useful in the nitrogen fixation process disclosed in our earlier application referred to hereinbefore. We estimate that such a nitrogen fixation process is competitive with other processes, when only 50% of the recoil energy of the fission fragments is absorbed in the air atmosphere under the proper conditions. Using the mineral wool of our present invention that 50% figure may be easily exceeded.

One important advantage of our invention relates to the stability of the fibrous material under neutron radiation. As is well known, solid uranium fuel elements tend to become deformed under neutron bombardment, particularly at elevated temperatures. This is often referred to as dimensional instability. Glass wool has certain self-annealing properties that avoid this instability. Another advantage is that glass resists oxidation whereas solid uranium is well known to be extremely reactive so that the uranium must be carefully encased in a non-corrosive metal. This, in turn, results in metallurgical problems of great difficulty.

Since many embodiments might be made of the present invention and since many changes might be made in the embodiment described, it is to be understood that the foregoing description is to be interpreted as illustrative only and not in a limiting sense.

We claim:

1. A source of fission product recoil energy comprising thermal neutron irradiated glass wool having a diameter of about 1–5 microns and containing an isotope fissionable by thermal neutrons.

2. A source of fission product recoil energy comprising thermal neutron irradiated glass wool having a diameter of about 1–5 microns, said glass having the approximate composition:

| | Percent |
|---|---|
| $SiO_2$ | 40–50 |
| $Al_2O_3$ | 5–12 |
| $TiO_2$ | 10–20 |
| $ZrO_2$ | 2–7 |
| $Na_2O$ | 15–25 |
| $U_3O_8$ | 10 | said $U_3O_8$ being enriched to at least 90% $U^{235}$.

3. The method of preparing a source of fission product recoil energy that comprises preparing 10 percent uranium glass wool having a diameter of about 1–5 microns, the uranium content of said wool having the composition $U_3O_8$ enriched to approximately 90 percent $U^{235}$, and subsequently irradiating the wool with thermal neutrons to fission the $U^{235}$ therein.

References Cited in the file of this patent

UNITED STATES PATENTS

| 1,956,176 | Parkinson | Apr. 24, 1934 |
| 1,956,948 | Fatlinger et al. | May 1, 1934 |
| 2,226,404 | Grainger et al. | Dec. 24, 1940 |
| 2,378,328 | Robinson | June 12, 1945 |
| 2,394,493 | Schoenlaub | Feb. 5, 1946 |
| 2,494,259 | Nordberg | Jan. 10, 1950 |
| 2,510,795 | Blau et al. | June 6, 1950 |
| 2,559,259 | Roper | July 3, 1951 |
| 2,577,936 | Waggoner | Dec. 11, 1951 |
| 2,708,656 | Fermi et al. | May 17, 1955 |
| 2,870,030 | Stradley et al. | Jan. 20, 1959 |

FOREIGN PATENTS

| 629,415 | Great Britain | Sept. 20, 1949 |

OTHER REFERENCES

"Annual Review of Nuclear Science," vol. 2, publ. by Annular Reviews, Inc., Stanford, Calif. (1953), pages 399–409.

"The Properties of Glass," by George W. Morey, Reinhold Publ. Co., New York, N.Y. (1954), pages 455, 457.